No. 859,054.
H. J. FISCHER.
NUT LOCK.
APPLICATION FILED AUG. 27, 1906.
PATENTED JULY 2, 1907.
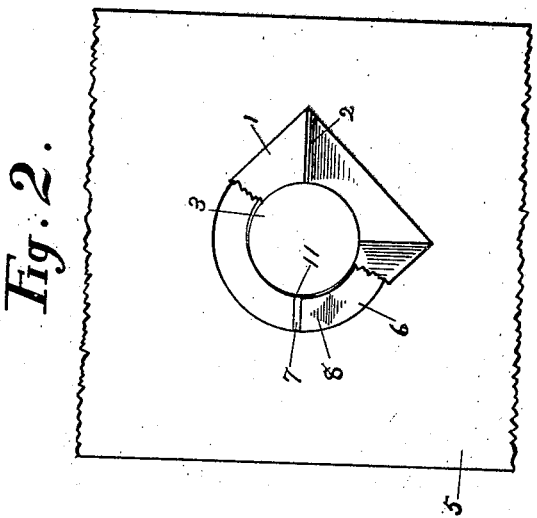
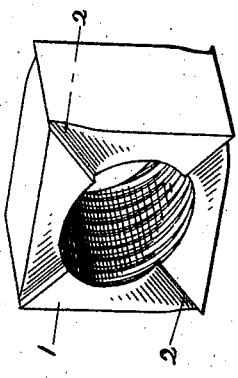
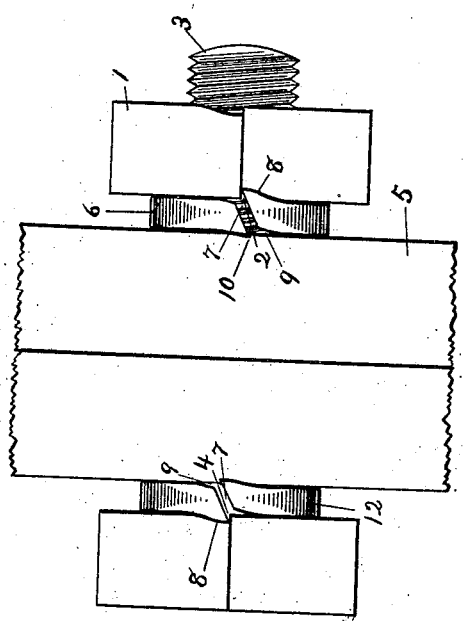
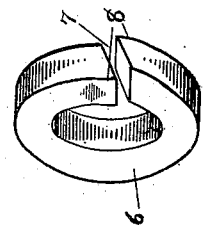
WITNESSES.
INVENTOR.

UNITED STATES PATENT OFFICE.

HENRY J. FISCHER, OF MONMOUTH, ILLINOIS, ASSIGNOR OF ONE-THIRD TO WILLIAM C. ABBOTT AND ONE-THIRD TO JOHN S. BROWN, BOTH OF MONMOUTH, ILLINOIS.

NUT-LOCK.

No. 859,054.  Specification of Letters Patent.  Patented July 2, 1907.

Application filed August 27, 1906. Serial No. 332,184.

*To all whom it may concern.*

Be it known that I, HENRY J. FISCHER, a citizen of the United States, residing at Monmouth, in the county of Warren and State of Illinois, have invented new and useful Improvements in Nut-Locks, of which the following is a specification.

This invention relates to certain new and useful improvements in a nut lock, to be used in connection with bolts, in securing together the separate parts of machinery, or other devices, the object in view being to provide a bolt and nut locking device that will effectually lock, and prevent the tap or nut getting loose on the bolt, and I do declare the following to be a full, clear, and exact description of the same, such as will enable others skilled in the art to which it appertains, to make and use the same.

The novel construction and arrangement of the several parts are hereinafter more fully described and then specifically defined in the appended claims.

In the drawings and figures of reference marked thereon, which form a part of this specification, like figures indicate like parts throughout the several views.

Figure 1 represents a side view, looking toward the corner edge of the nut. Fig. 2 is a view looking toward the point of the bolt, and the outer face of the lock nut, representing the nut partially broken away. Fig. 3 is a perspective view of a spring washer used in connection with the nut. Fig. 4 is a perspective view of the lock nut.

Reference now being had to the accompanying drawings by numerals, 1 represents the nut, having the depressions 2, cut or pressed in the face of the nut diagonally across from each corner; this location of the depression is deemed preferable, as the nut is thicker and stronger at this part; the nut may have one or more of such depressions in its face as is considered necessary, the nut being herein shown with such depressions in each of the two faces of the nut, for the purpose of reversing the nut, so that either face may be used in connection with the spring washer, or locking ring.

3 represents the bolt, to which the nut is attached, the head of the bolt being shown with depressions cut or pressed in its inner face, as shown at 4, in the same manner as the depressions in the face of the nut.

5 represents any parts through which the bolt passes to secure them together.

6 represents a split locking ring, or spring washer, placed on the bolt between the nut and the parts that are secured together, for the purpose of locking the nut on the bolt; the washer is bent in a spiral shape, to give it the spring tension, with an open space between the ends of the washer, which is shown at 7, the said ends being cut at an angle of about seventy degrees from the point at the face of the washer. The washer is increased in thickness at the face near the point, as shown at 8, to fit the depression in the face of the nut, there always being an open space between the opposite face of the washer, near the end, and the part in contact with the washer, as shown at 9, which prevents the faces of the washer being pressed together parallel, and causing the point at the face of the washer opposite the nut to take a sharp hold and cut in to the surface with which it comes in contact, as shown at 10, and thus securely lock the nut and prevent it turning off the bolt. By forming the end of the washer so as to fit snugly the depression in the face of the nut as shown in Fig. 1 of the drawings, several advantages are secured.

When the nut is reaching its final clamping position, the washer, owing to the snug fit of the free end thereof in the depression in the nut, is turned with the nut and when said nut reaches its final position the sharp lip 10 on the other end of the washer, will engage the members being clamped and hold the nut in this position so that said nut cannot be turned in either direction on said bolt without turning with it the washer. The thickened end of the washer also serves to hold the end of the same in engagement with the nut so that when the nut is in its final clamping position, it is practically impossible to spring the free end of the washer out of engagement with the nut so as to release the nut.

When the nut is screwed up close against the washer 6, the point of the washer 6 next to the nut springs into the depression in the face of the nut; then any pressure against the nut in a direction that would have a tendency to turn the nut off the bolt, whether caused by a jarring or tremulous motion, or otherwise, would only move the washer 6 with the nut, and cause the point shown at 10, to cut deeper into the surface and effectually lock the nut on the bolt; and will also cause the inner edge of the end of the washer 6 to press against the bolt, which is shown at 11, in Fig. 2 of the drawing; thus giving a locking contact with the washer 6 at three separate points, which is shown between the point of the washer 6 and the nut at 2, between the other point of the washer 6 and the surface opposite, shown at 10, and between the inner edge of the end of the washer 6 and the bolt, as shown at 11.

It is obvious that either a right hand thread bolt and nut, or a left hand thread bolt and nut can be used, the depressions in the one being reverse from the other; but with a right hand nut, a left hand washer is used, and with a left hand nut, a right hand washer is used.

Where machine bolts are used, and the surface of the parts secured together is very smooth and hard, one of these spring washers may be used between the head of the bolt and the parts secured together, as shown at 12. It is also obvious that the said washer shown at 12, operates in practically the same manner as the washer shown at 6, to lock together the bolt and the parts through which the bolt passes.

In referring to the drawings it is evidently plain to be seen that, if an ordinary nut, with a plain smooth face is used, the result, or effect, will be practically the same; as the two points of the locking ring or washer are the same, the points will cut into the surface with which they come in contact, each point the same as the other, in practically the same manner as shown in the drawing at 10.

I am aware that devices for locking nuts on bolts have been made wherein the nut is constructed with ratchet shaped notches or depressions in the face of the nut and that open spring washers have been used, but I am not aware that a nut and bolt lock has ever been made as herein shown and described.

Having thus described my invention, what I claim as new and desire to secure by Letters Patent is:—

A bolt and nut lock including in combination a bolt, a nut disposed on said bolt, said nut having a depression in its face forming a locking lip, means for locking said bolt against rotation in one direction and means for locking said nut against rotation in the opposite direction, including a split washer, the free ends of said washer having enlarged portions extending beyond the plane of their upper and lower faces, said ends being cut at an acute angle thereby forming a sharp engaging lip, the enlargement on one end of said washer conforming in shape to the depression in said nut, whereby said enlargement is held closely in contact with said nut and said nut is prevented from movement in either direction without rotating said washer therewith.

In testimony whereof I affix my signature in presence of two witnesses.

HENRY J. FISCHER.

Witnesses:
C. D. SHMICK,
P. C. TAPPING.